United States Patent [19]

Yonemura et al.

[11] Patent Number: 4,788,849
[45] Date of Patent: Dec. 6, 1988

[54] STEAM TRAP OPERATION MONITORING DEVICE

[75] Inventors: Masao Yonemura; Takeshi Yokoyama, both of Hyogo, Japan

[73] Assignee: TLV Co., Ltd., Hyogo, Japan

[21] Appl. No.: 27,517

[22] Filed: Mar. 18, 1987

[30] Foreign Application Priority Data

Apr. 15, 1986 [JP] Japan .................................. 61-87432

[51] Int. Cl.⁴ .............................................. G01M 3/24
[52] U.S. Cl. ............................ 73/40.5 A; 73/40.5 R; 364/550
[58] Field of Search ................. 73/40, 40.5 R, 40.5 A; 340/605; 364/550, 551

[56] References Cited

U.S. PATENT DOCUMENTS 4,202,490  5/1980  Gunkel et al. ......................... 73/151
4,325,223  4/1982  Cantley ................................ 364/551
4,333,339  6/1982  McNeely et al. .................... 374/139
4,543,817  10/1985  Sugiyama ......................... 73/40.5 A
4,630,633  12/1986  Vallery .............................. 137/185

Primary Examiner—Stewart J. Levy
Assistant Examiner—Hezron E. Williams
Attorney, Agent, or Firm—Toren, McGeady & Associates

[57] ABSTRACT

A device for monitoring the operation of steam traps, wherein data representing the operation of the steam traps are transmitted to a host computer for storing the data, the host computer operating to record and display a summation of leakage in a plurality of steam traps as well as the totalization and analysis of leakage in terms of monetary cost or a rejection rate and changes in the steam traps with time in order to predict time required for repair or replacement of the steam traps.

3 Claims, 1 Drawing Sheet

STEAM TRAP OPERATION MONITORING DEVICE

BACKGROUND OF THE INVENTION

1. Field of the Invention

The present invention relates generally to steam trap instruments and more particularly to a device for monitoring the operating condition of steam traps to determine, for example, whether or not the steam traps are leaking steam and to measure the leakage of steam A steam trap is usually mounted on steam lines or equipment using steam and permits only the automatic removal of collected water without the leakage of steam. More and more strict observation of steam leaks has come to be required as a result of a rise in fuel cost. Avoiding steam leakage has now become a prerequisite for the adoption of the steam trap. Steam-pipelines, after installation, are strictly monitored and a steam trap which is leaking steam is repaired or replaced quickly.

There have been developed and put to practical use various types of steam trap leakage detectors.

For instance, a sight window is provided in the pipeline on the outlet side of the steam trap to allow visual observation of the state of a fluid inside the equipment, and also a temperature gauge and vibrometer are employed to measure the surface temperature of the steam trap and the sonic characteristics of the flow of the fluid.

In either case, only a qualitative observation is made on leakage of the steam trap and a quantitative measurement of leakage cannot be made. Therefore, an evaluation of the degree of leakage can only be made by human evaluation.

2. Description of the Prior Art

In the prior art, there have been developed simple steam trap leakage detectors.

One such detector is disclosed in Japanese Patent Application No. 61-57499. This is a device for determining steam leakage on the basis of a correlation between sensed vibrations and steam pressure as a parameter and steam leakage data that have been measured and stored in advance. The device operates by applying a detector-, including a vibration sensor and a temperature sensor that are built in, to the outside surface of a casing of the steam trap.

Another device disclosed in Japanese Patent Application No. 61-56521 is disposed between the steam supply and the steam trap, and steam leakage is determined from a correlation between the quantity of steam passing through an orifice and the water level o its primary side.

The aforementioned device is capable of determining the operation of each steam trap and of measuring steam leakage, but troublesome manual operation is required for the preparation of a list of results of operational determinations and leakage measurement, and for a summation of leakage and of a totalization and analysis of leakage in terms of monetary costs or rejection rate. In addition, repair or replacement of a trap which leaks steam is carried out after checkups, and, accordingly, positive maintenance of the steam traps could not be accomplished.

SUMMARY OF THE INVENTION

The present invention is therefore directed toward providing apparatus enabling the automatic totalization and analysis of checkup data and the prediction of a repair or replacement period.

The technological manifestation of the present invention disclosed for the solution of the aforementioned problems comprises a device whereby the operation of each trap is monitored and steam leakage is measured and data stored by means of a steam leakage detector. The aforesaid stored data are transmitted to a host computer which records and displays the results of the evaluation of the operation and leakage of each trap, summation and analysis of total leakage at all traps and the leakage in terms of the amount of monetary cost involved or a rejection rate, and the change in each steam trap with time.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described the preferred embodiment of the invention.

DETAILED DESCRIPTION OF THE PREFERRED EMBODIMENT

Figure 1:
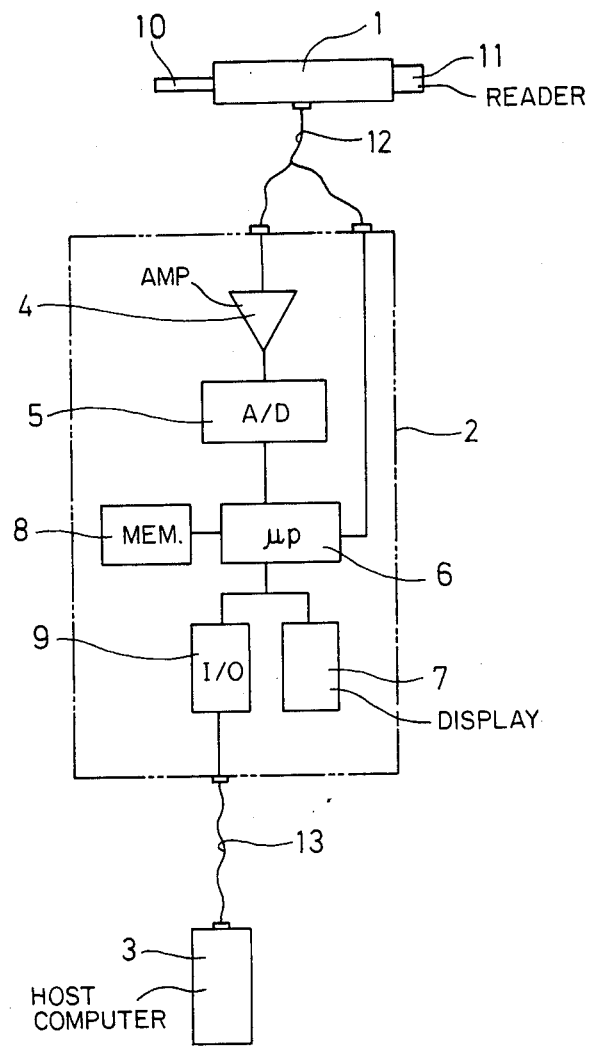
FIG. 1 is a schematic view showing the constitution of a steam trap operation monitoring device in accordance with the present invention.

Referring now to the drawing, there is shown a steam trap operation monitoring device according to the present invention which comprises a steam leakage detector 1, an arithmetic display device 2 and a host computer 3.

A trap operation detecting section 10 is formed at one end of the detector 1 and a bar-code reader 11 at the other end.

The bar-code reader 11 reads the trap number and type, and inputs this data into a microcomputer 6 of the arithmetic display device 2. A signal received by the operation detecting section 10 is transmitted to the arithmetic display device through a cable 12, amplified by an amplifier 4, digitally converted by an analog/digital converter 5, and then fed into the microcomputer 6.

The microcomputer 6 computes the presence or absence of leaks and the leakage, displays the information on the display section 7 and, at the same time, stores the data regarding the monitoring of the number and type, operation and leakage of each trap in a storage section 8. After a check of all steam traps, the data of measurement stored in the storage section 8 are sent to the host computer 3 from a data transmitter section 9 through a cable 13.

The host computer 3 records and displays the results of monitoring of the operation and leakage of each trap, summation and analysis of total leakage of all traps and leakage in terms of the monetary cost or rejection rate as well as the changes in each steam trap with time.

Thus, from the foregoing it will be seen that in the operation of the equipment of the invention, monitoring of the operation of each steam trap and the measurement of steam leakage are performed by the steam leakage detector. The result of such monitoring of the operation and measurement of leakage is once stored in the storage section of the steam leakage detector and after a check of all steam traps, the data stored are transmitted to the host computer.

The host computer records and displays the results of the monitoring of the operation of and leakage at each steam trap, necessary totalization and analysis of the total leakage at all traps and leakage in terms of the monetary cost and rejection rate, and a change in the leakage at each steam trap with time.

Therefore, printing, totalization and analysis of a result of checkups can automatically and correctly be carried out, and, accordingly, maintenance control of the steam traps can be easily performed. Also, as the change of leakage with time is recorded and displayed, the time of repair or replacement can be automatically determined by predetermining the time of repair or replacement on the basis of leakage.

Manual labor for inputting into the computer can be saved by reading with a bar-code reading the trap number and type of each steam trap printed on a bar-code attached on each steam trap.

As a result, the present invention provides several distinct advantages.

Since the result of checkups is automatically recorded, totalized and printed by the host computer, manual operation can be dispensed with, enabling work saving and standardization.

Furthermore, since changes in steam leakage at the steam trap with time are recorded and displayed, early finding of defective parts and repairing or replacing them can prevent the waste of production costs, contributing toward energy saving.

While a specific embodiment of the invention has been shown and described in detail to illustrate the application of the inventive principles, it will be understood that the invention may be embodied otherwise without departing from such principles.

What is claimed is:

1. A steam trap operation sensing device comprising: steam leakage detector means for measuring and storing data representing the operation of steam traps, and host computer means to which said data are transferred for storing said data, said host computer means operating to record and display the summation of leakage in a plurality of steam traps, the totalization and analysis of leakage in terms of at least one of monetary cost and a rejection rate; and changes in each of said steam traps with time, said steam leakage detector means comprising an operation detecting section for sensing parameters of a plurality of steam traps to generate analog signals, an analog-to-digital converter connected to said operation detecting section for converting the analog signals to digital signals, a microcomputer connected to said analog-to-digital coverter for receiving the digital signals and for analyzing the digital signals to detect the presence of steam leaks in each steam trap based on the parameters sensed for each steam trap, steam trap reader means for identifying a unique code for each steam trap, said reader means being connected to said microcomputer for correlating the digtal signals for each steam trap with a code representing that steam trap, and storage means connected to said microcomputer for storing data concerning the condition and change in condition of each steam trap with regard to steam leakage.

2. A steam trap operation sensing device according to claim 1, wherein at least one of the parameters is vibration sensed for each steam trap, said microcomputer being programmed to recognize a pattern of vibrations indicative of a steam leak in each steam trap.

3. A steam trap operation sensing device according to claim 1, wherein said steam leakage detector means including a display section connected to said microcomputer for displaying the summation of leakage in the plurality of steam traps, and a data transmitter section connected between said microcomputer and said host computer means for transferring data from said microcomputer and from said storage means to said host computer means.

* * * * *